Figure 3:
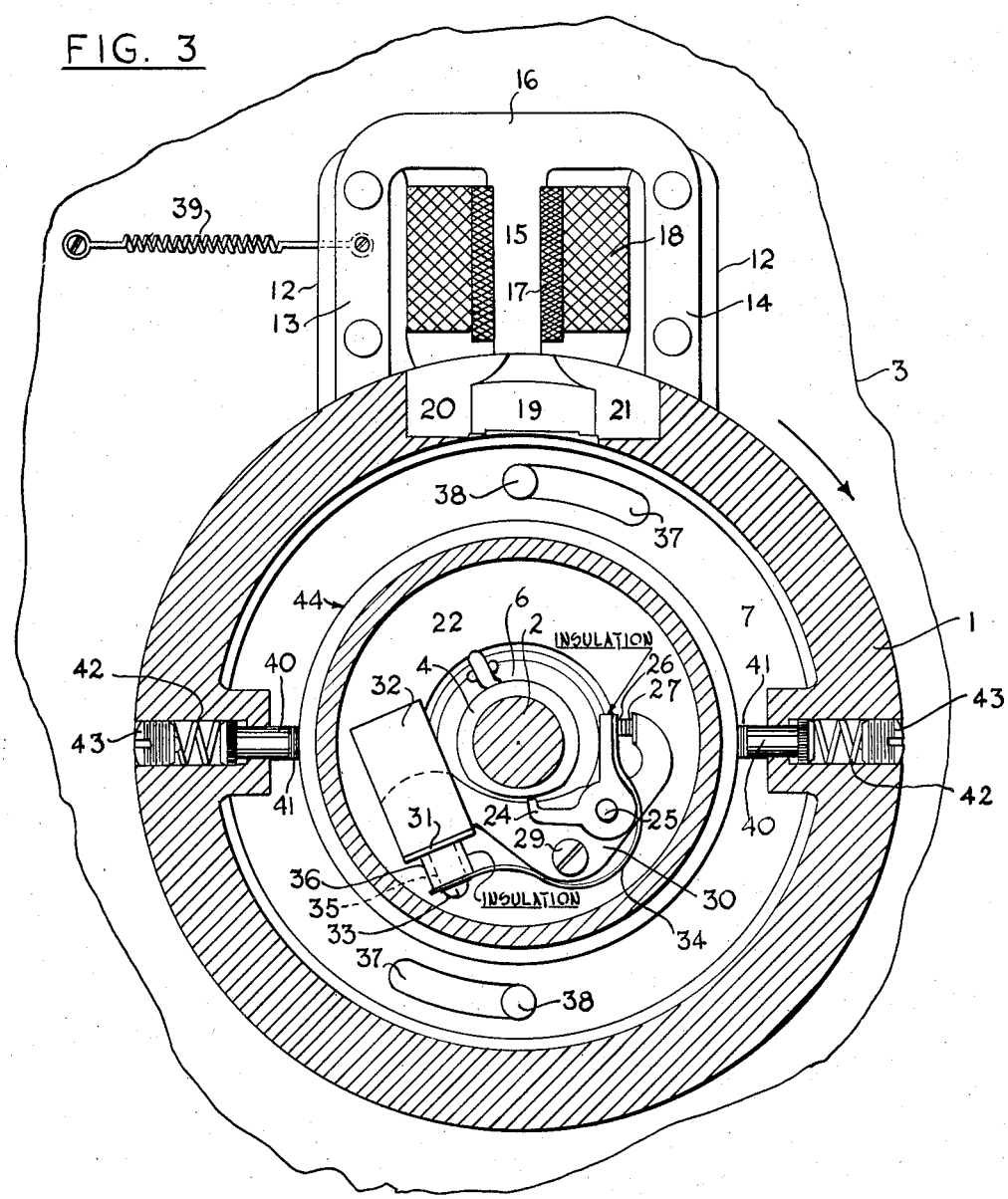

July 15, 1958  G. F. McGREVY  2,843,769
SPARK CONTROL FOR FLYWHEEL MAGNETOS
Filed Oct. 17, 1956  2 Sheets-Sheet 1
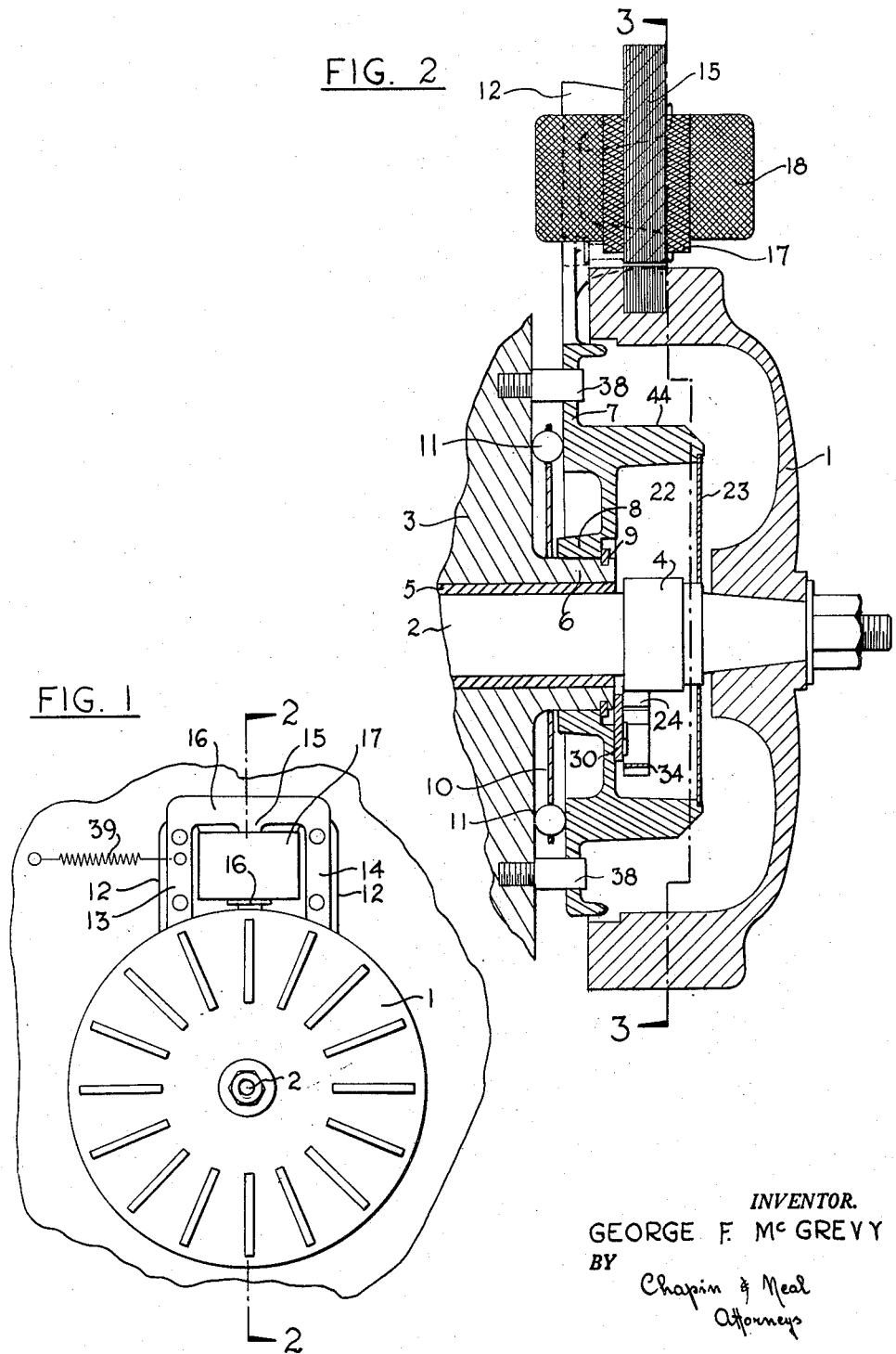
INVENTOR.
GEORGE F. McGREVY
BY Chapin & Neal
Attorneys July 15, 1958  G. F. McGREVY  2,843,769
SPARK CONTROL FOR FLYWHEEL MAGNETOS
Filed Oct. 17, 1956  2 Sheets-Sheet 2

INVENTOR.
GEORGE F. McGREVY
BY
Chapin & Neal
Attorneys

United States Patent Office 2,843,769
Patented July 15, 1958

2,843,769

SPARK CONTROL FOR FLYWHEEL MAGNETOS

George F. McGrevy, Agawam, Mass., assignor to Globe-Union Inc., Milwaukee, Wis., a corporation of Delaware Application October 17, 1956, Serial No. 616,423

4 Claims. (Cl. 310—70)

This invention relates to flywheel magnetos and more particularly, to means for automatically advancing and retarding the spark, controlled by variations in engine speed.

The invention has for an object to effect the change in spark timing by moving the stator plate of the magneto on the pilot flange of the engine crankcase, such plate carrying the breaker-point mechanism and the coil and core group, which cooperates with the magnet and pole-piece group that is carried by the flywheel.

More particularly, the invention has for an object to provide in the flywheel radially mounted clutch elements that are spring pressed inwardly to grip a cylindrical surface of the stator plate and turn the same to a spark-retarded position at low engine speeds, such clutch elements being acted on by centrifugal force which at higher engine speeds so lessens the pressure of the clutch elements on said surface that the stator plate may be turned in the opposite direction by a spring into a spark-advanced position.

The invention will be disclosed with reference to one illustrative embodiment of it in the accompanying drawings in which, Fig. 1 is a small-scale front elevational view of a flywheel magneto embodying the invention;

Fig. 2 is a cross sectional view thereof taken on the line 2—2 of Fig. 1 and drawn to a larger scale; and Fig. 3 is a sectional elevational view taken on the line 3—3 of Fig. 2.

Referring to these drawings, the magneto includes a flywheel 1 adapted to be fixed, as indicated, to the crankshaft 2 of an internal combustion engine, a portion of the crankcase of which is indicated at 3. The crankshaft also has fixed thereto a cam 4 for actuating the breaker point mechanism. The crankshaft has a bearing 5 in a hub 6 on the crankcase. The outer periphery of hub 6 forms a cylindrical pilot flange on which the stator plate 7 of the magneto is adapted to be mounted for a limited amount of turning movement. Such plate has a hub 8 with a cylindrical bore to closely fit the pilot flange and is held against axially outward movement thereon by a snap ring 9, mounted in a circumferential groove in the flange. Located between the crankcase 3 and the back of the stator plate 7 and rotatably mounted on the pilot flange is a thin plate 10 having a circular series of angularly-spaced holes each receiving a ball bearing 11. These bearings 11 prevent axial inward movement of the hub on the pilot flange. These bearings 11, being spaced radially outward a substantial distance from the pilot flange prevent any tipping of the hub 8 of the stator plate on the pilot flange.

The stator plate carries a coil and core group and the flywheel a magnet and pole piece group. As shown in Fig. 3, the stator plate 7 has two parallel upstanding arms 12 to which are riveted the outer legs 13 and 14 of a group of iron laminations. A central core 15 is connected to the legs 13 and 14 by a cross bar 16. The core 15 carries primary and secondary coils 17 and 18, respectively. The rim of the flywheel is of non-magnetic material and has embedded therein a permanent magnet 19 and two pole shoes 20 and 21 connected one to each polar end of the magnet. The flywheel 1 rotates clockwise as viewed in Fig. 3 and the magnet 19 periodically establishes a magnetic circuit through core 15 first in one and then in the opposite direction in the usual and well known manner. The primary coil, as usual, is connected in a closed circuit, which is opened and closed by breaker point mechanism located in a central breaker box 22 (normally closed by the cover 23 shown in Fig. 2). This mechanism comprises a breaker lever 24 pivoted at 25 and carrying a breaker point 26 cooperating with a breaker point 27 fixed to an upstanding part of the breaker plate 30, which is secured by a screw 29 to the back wall of the breaker box. The plate 30 also has an upstanding ear 31 to which a condenser 32 is fixed by a screw 33. This screw also clamps one end of a flat spring 34 to the terminal post 35 of the condenser, an insulating tube 36 encompassing such terminal and being interposed between the spring 34 and ear 31. The other terminal of the condenser is its metallic outer casing which is connected to breaker plate 30 and thus to stator plate 7 and the crankcase of the engine and thereby grounded. One terminal of the primary coil 17 will be grounded and the other will be connected to spring 34 by screw 33. This spring serves as an electrical conductor and also to hold the breaker lever 24 in contact with cam 4. When the pole shoes 20 and 21 have moved clockwise until they are respectively out of contact with core 15 and leg 14 and have become spaced therefrom by a gap of predetermined length, the cam 4 will have moved far enough to actuate the breaker lever 24 and separate the breaker points 26 and 27. An electromotive force will then be induced in the secondary coil 18 in the usual and well known manner, such coil supplying the spark plug of the engine.

This invention provides for automatically advancing and retarding the spark without changing the edge gap between the pole shoes and core members. This is effected by moving the stator plate 7 on the pilot flange. Since the core and coil group and the breaker point mechanism are both carried by the stator plate, they will move to the same angular extent and the breaker points will always open when the desired predetermined gap between the pole shoes and cores occurs. The stator plate has two curved slots 37 in its back wall and into these project the outer ends of two pins 38, which are fixed as indicated to the engine crankcase 3. These pins and slots limit the movement of the stator plate from the retarded position shown to an advanced position wherein pins 38 engage the other ends of slots 37. A spring 39 fixed at one end to the crankcase and at the other end to one of the stator plate arms 12 and tends when permitted, to move the stator plate 7 counterclockwise to the extent permitted and advance the spark. The flywheel 1 has two pins 40 each having a clutch facing 41 on its inner end and each pressed radially inward by a spring 42 mounted in a recess in the rim of flywheel 1 which recess is closed by a plug 43. These facings 41 are pressed against the cylindrical wall 44 by the springs and at low engine speeds clutch this wall and tend to turn the stator plate clockwise and move it into the illustrated position, in which the spark is retarded. The spring 39 cannot overcome the force of these clutch elements 41 when the flywheel is at rest or moving slowly. However, as the flywheel 1 moves faster, centrifugal force acting on the radially-positioned clutch elements tends to move them outwardly, lessening the pressure on wall 44 until spring 39 is able to move the stator plate counterclockwise into advanced position. When the engine speed slackens sufficiently, the clutch elements will again grip the wall 44 with sufficient force to overcome that of spring 39 and move the stator plate back into retard position.

The invention thus provides an improved means for automatically advancing and retarding the spark in a flywheel magneto in accordance with the engine speed and for effecting this work without changing the edge gaps in the magneto at the time the breaker points open.

What is claimed is:

1. In a flywheel magneto, a stator plate having a hub with a cylindrical bore adapted to be mounted to turn on the outer periphery of a cylindrical pilot flange on the crankcase of an internal combustion engine, through which flange the crankshaft of the engine passes, a flywheel adapted to be fixed to the engine crankshaft, a magnet and pole-piece group, a coil and core group, one such group being fixed to the flywheel and the other to the stator plate, breaker point mechanism mounted on the stator plate and adapted to be actuated by a cam on said crankshaft, means for limiting the turning of said plate on said flange from a retard to an advance position, said plate having a cylindrical surface coaxial with the pilot flange and crankshaft, a friction clutch element carried by the flywheel and yieldably urged radially inward to engage said cylindrical surface and operable to turn the plate to retard position when the flywheel is moving at relatively low speeds, resilient means for moving said plate to advance position but ineffective at low flywheel speeds to overcome the force exerted by said clutch element, said clutch element being movable outwardly at high flywheel speeds to decrease its pressure on said cylindrical surface and enable said resilient means to move the plate to advance position.

2. The combination, as claimed in claim 1, in which the means for limiting the turning of the stator plate consists of an arcuate slot in the back wall of said plate and a pin engaged near one end in said slot and adapted at the other end to be fixed to the engine crankcase.

3. The combination, as claimed in claim 1, in which the friction clutch element consists of a pin mounted in the flywheel for radial sliding movement and having on its inner end a clutch facing to engage said surface, and a spring in the flywheel for forcing the pin inwardly and pressing the clutch facing against said cylindrical surface.

4. In a flywheel magneto, a stator plate mounted for limited rotative movement about the axis of an internal combustion engine crankshaft, a flywheel adapted to be fixed to the crankshaft for rotation therewith, magnet means, coil means, one of said last two named means being mounted on the stator plate and the other on the flywheel, breaker point mechanism mounted on the stator plate and adapted to be actuated by a cam on said crankshaft, means for limiting the rotative movement of said stator to extremes of a fully retarded position and a fully advanced position, clutch means mounted on said flywheel and engageable with said stator, resilient means urging the clutch means into driving engagement with said stator to rotate the stator to its fully retarded position at low flywheel speeds, said clutch means being movable in response to the centrifugal force created by wheel rotation to gradually bring said means out of driving engagement with the stator as the speed of flywheel rotation increases, and resilient means urging said stator to its fully advanced position with a torque force less than that of the clutch means at lower flywheel speeds.

References Cited in the file of this patent

FOREIGN PATENTS 959,125   France _____ Sept. 21, 1949